US007197881B2

(12) United States Patent
Winstanley

(10) Patent No.: US 7,197,881 B2
(45) Date of Patent: Apr. 3, 2007

(54) LOW LOSS FLOW LIMITED FEED DUCT

(75) Inventor: David K. Winstanley, Gilbert, AZ (US)

(73) Assignee: Honeywell International, Inc., Morristown, NJ (US)

( * ) Notice: Subject to any disclaimer, the term of this patent is extended or adjusted under 35 U.S.C. 154(b) by 352 days.

(21) Appl. No.: 10/811,272

(22) Filed: Mar. 25, 2004

(65) Prior Publication Data

US 2005/0210882 A1 Sep. 29, 2005

(51) Int. Cl.
*F02C 6/08* (2006.01)

(52) U.S. Cl. .......................................... 60/785; 138/39

(58) Field of Classification Search .................. 60/782, 60/785; 138/39; 415/144, 145, 914
See application file for complete search history.

(56) References Cited

U.S. PATENT DOCUMENTS 2,037,940 A * 4/1936 Stalker ........................ 138/39
3,033,307 A * 5/1962 Sanders et al. ............. 181/224
3,925,980 A 12/1975 McCombs
4,517,796 A 5/1985 McCombs, Jr.
4,720,235 A 1/1988 Lachance et al.
5,235,801 A 8/1993 Evenson et al.
5,380,151 A 1/1995 Kostka et al.
5,687,563 A 11/1997 Thompson, Jr.
5,779,196 A 7/1998 Timar
5,943,856 A 8/1999 Lillibridge et al.
6,655,207 B1 12/2003 Speldrich et al.

* cited by examiner

*Primary Examiner*—L. J. Casaregola
(74) *Attorney, Agent, or Firm*—Ingrassia Fisher & Lorenz

(57) ABSTRACT

A duct that preferably includes a low loss inlet section is configured to include one or more flow limiting passages that extend through a portion of the low loss inlet section. The flow limiting passages are located and configured such that in the desired operating flow range of the duct, the fluid exiting the flow limiting passages has minimal effect on fluid flow into and through the duct. However, at relatively high pressure ratios, the fluid exiting the flow limiting passages will disturb the fluid entering the duct, causing mixing and shock losses, which will limit the fluid flow rate into and through the duct.

22 Claims, 2 Drawing Sheets

LOW LOSS FLOW LIMITED FEED DUCT

FIELD OF THE INVENTION

The present invention relates to bleed air ducts and, more particularly, to a bleed air duct configured to exhibit low loss flow characteristics during normal rates of flow, while limiting fluid flow into and through the duct.

BACKGROUND OF THE INVENTION

A gas turbine engine may be used to supply power to various types of vehicles and systems. For example, gas turbine engines may be used to supply propulsion power to an aircraft. Many gas turbine engines include at least three major sections, a compressor section, a combustor section, and a turbine section. The compressor section receives a flow of intake air and raises the pressure of this air to a relatively high level. In a multi-spool (e.g., multi-shaft) engine, the compressor section may include two or more compressors. The compressed air from the compressor section then enters the combustor section, where a ring of fuel nozzles injects a steady stream of fuel. The injected fuel is ignited by a burner, which significantly increases the energy of the compressed air.

The high-energy compressed air from the combustor section then flows into and through the turbine section, causing rotationally mounted turbine blades to rotate and generate energy. The air exiting the turbine section is then exhausted from the engine. Similar to the compressor section, in a multi-spool engine the turbine section may include a plurality of turbines. The energy generated in each of the turbines may be used to power other portions of the engine.

In addition to providing propulsion power, a gas turbine engine may also, or instead, be used to supply either, or both, electrical and pneumatic power to the aircraft. For example, some gas turbine engines include a bleed air port between the compressor section and the turbine section. The bleed air port allows some of the compressed air from the compressor section to be diverted away from the turbine section, and used for other functions such as, for example, the aircraft environmental control system, and/or cabin pressure control system.

Although highly unlikely, it is postulated that a leak may occur in one or more of the ducts through which engine bleed air is flowing. In such an unlikely circumstance, bleed air flow rate through the leaking duct can be detrimental to turbine engine operation. Thus, many bleed air ducts include orifices or bleed dumps, which limit flow through the duct, if a leak were to occur. While these present flow limiting configurations do limit flow, these configurations also suffer certain drawbacks. For example, the present flow limiting configurations can result in undesirably large pressure losses to achieve a desired bleed air flow during normal bleed air operations, which can adversely impact gas turbine engine efficiency. Moreover, bleed air may need to be supplied from higher pressure stages of the compressor section, or designing compressor stages to a higher pressure ratio. Bleeding air from higher pressure stages can increase fuel burn and cause higher bleed air temperatures. This in turn can adversely impact overall operational efficiency and costs.

Hence, there is a need for a system for limiting flow in bleed air ducts that, as compared to present systems, exhibits reduced pressure losses during normal bleed air operations and/or does not adversely impact gas turbine engine efficiency and/or does not adversely impact overall operational efficiency and cost. The present invention addresses one or more of these needs.

SUMMARY OF THE INVENTION

The present invention provides a system for limiting flow in a duct, while exhibiting relatively reduced pressure losses in a desired flow rate range.

In one embodiment, and by way of example only, a low loss flow limited passageway includes a duct and one or more flow limiting passages. The duct includes at least an inlet port that is adapted to receive a flow of fluid from an inlet plenum and that has at least a first cross sectional flow area. At least a portion of the duct downstream of the inlet port has a second cross sectional flow area that is less than the first cross sectional flow area. Each of the one or more flow passages extends through the duct and includes an inlet port in fluid communication with the inlet plenum and an outlet port in fluid communication with the duct flow passageway proximate the portion thereof that has the second cross sectional flow area.

In another exemplary embodiment, a low loss flow limited passageway includes a duct and one or more flow limiting passages. The duct has a wall that defines a flow passageway, and includes at least an inlet port in fluid communication with the flow passageway. The duct inlet port is adapted to receive a flow of fluid from an inlet plenum and has a cross sectional flow area that varies, whereby when fluid flows through the inlet port into the flow passageway a minimum static fluid pressure is developed in the flow passageway at a location adjacent the inlet port. The flow limiting passages extend through the duct, and include an inlet port in fluid communication with the inlet plenum and an outlet port in fluid communication with the duct flow passageway proximate the location where the minimum static fluid pressure is developed.

In yet another exemplary embodiment, a low loss flow limited passageway includes a duct and one or more flow limiting passages. The duct has a wall that defines a flow passageway, and includes at least an inlet section. The duct inlet section includes an inlet flow port adapted to receive a flow of fluid from an inlet plenum, and an outlet flow port in fluid communication with the flow passageway. The inlet section is configured to have a cross sectional flow area that varies from a maximum cross sectional flow area proximate its inlet flow port to a minimum cross sectional flow area proximate its outlet flow port. The flow limiting passages extend through the inlet section. Each flow limiting passage includes an inlet port adapted to receive a flow of fluid from the inlet plenum, and an outlet port disposed proximate the minimum cross sectional flow area and in fluid communication with the flow passageway.

In yet still another exemplary embodiment, a low loss flow limiting passageway includes a duct, a flow venture, and one or more flow limiting passages. The duct has a wall that defines a flow passageway. The flow venturi is disposed within the duct flow passageway, and has an upstream end, a downstream end, and a flow constricting throat disposed therebetween. The flow limiting passages extend through the duct, and include an inlet port in fluid communication with the flow venturi upstream end, and an outlet port in fluid communication with the flow constricting throat.

In still another exemplary embodiment, a low loss flow limited passageway includes a duct a one or more flow limiting passages. The duct has a wall that defines a flow passageway, and includes at least including an inlet structure adapted to receive a flow of fluid from an inlet plenum. The inlet structure is additionally configured to have a loss coefficient of about 0.04 or less. The flow limiting passages extend through the inlet structure and include an inlet port adapted to receive a flow of fluid from the inlet plenum, and an outlet port disposed proximate the minimum cross sectional flow area and in fluid communication with the flow passageway.

In still other embodiments, an engine bleed air system includes a duct fluidly coupled to receive a flow of bleed air from a gas turbine engine.

Other independent features and advantages of the preferred low loss flow limiting feed duct will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention. In this regard, while the present embodiment is, for ease of explanation, depicted and described as being implemented in an aircraft gas turbine engine bleed air system, it will be appreciated that it can be implemented in various other systems and environments, and can be used in any one of numerous applications of fluid flow in a pipe or tube where it may be desirable to provide a flow limiting device at high flow rates, while limiting high pressure losses at normal flow rates.

Figure 1:
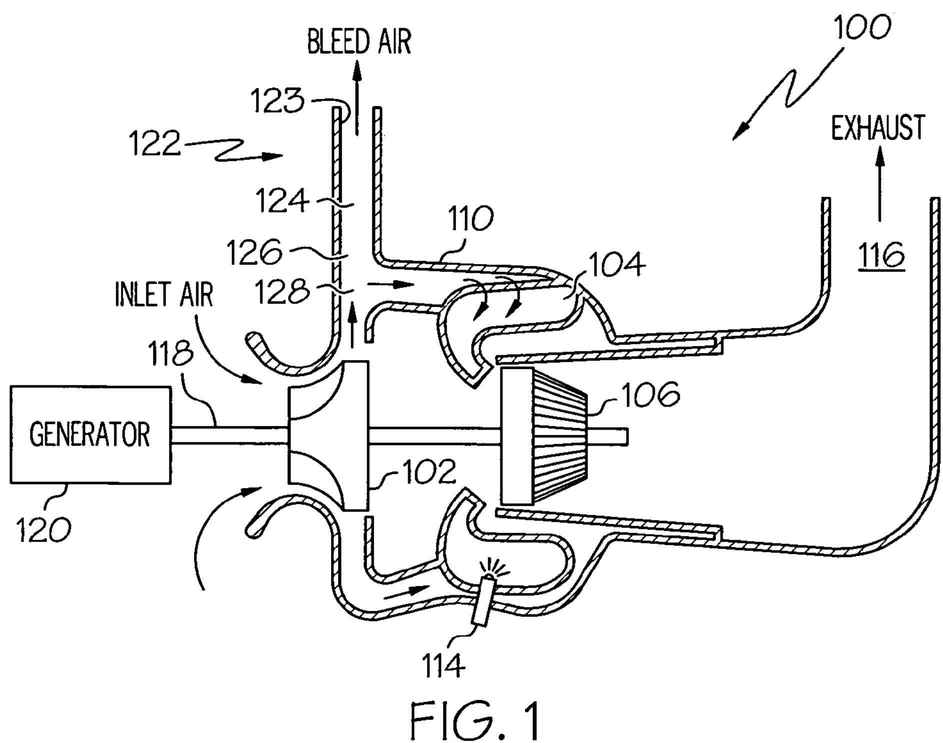
FIG. 1 is a simplified representation of a gas turbine engine that may be used to supply bleed air flow to one or more ducts.

Turning now to the description and with reference first to FIG. 1, a simplified representation of a gas turbine engine that may be used to supply bleed air is shown. The gas turbine engine 100, which in the depicted embodiment is an auxiliary power unit, includes a compressor 102, a combustor 104, and a turbine 106, all disposed within a case 110. The compressor 102 raises the pressure of air directed into it via an air inlet 112. The compressed air is then directed into the combustor 104, where it is mixed with fuel supplied from a fuel source (not shown). The fuel/air mixture is ignited using one or more igniters 114, and high energy combusted air is then directed into the turbine 106. The combusted air expands through the turbine 106, causing it to rotate. The air is then exhausted via an exhaust gas outlet 116. As the turbine 106 rotates, it drives, via a shaft 118 coupled to the turbine 106, equipment in, or coupled to, the engine 100. For example, in the depicted embodiment the turbine 106 drives the compressor 102 and a generator 120 coupled to the engine 100.

A bleed air duct 122 is disposed downstream of the compressor 102. The bleed air duct 122 includes a wall 123 that defines a flow passageway 124, and an inlet port 126 that fluidly communicates the flow passageway 124 with a plenum 128 formed in the engine case 110. The bleed air duct 122 is used to supply bleed air from the engine 100 to one or more other aircraft systems. In particular, during operation of the gas turbine engine 100 bleed air flows from the plenum 128, into and through the inlet port 126, into and through the bleed air duct flow passageway 124, and into one or more distribution ducts (not shown) that direct the bleed air to a desired end-use system.

The bleed air duct 122 is configured to limit maximum bleed air flow through the bleed air duct flow passageway 124, while at the same time exhibit a relatively low pressure loss flow characteristic in the desired bleed air flow range. The configuration of the bleed air duct 122, according to one particular embodiment, that provides these functions and exhibits these characteristics is partially shown in cross section FIG. 2, and will now be described in more detail.

Figure 2:
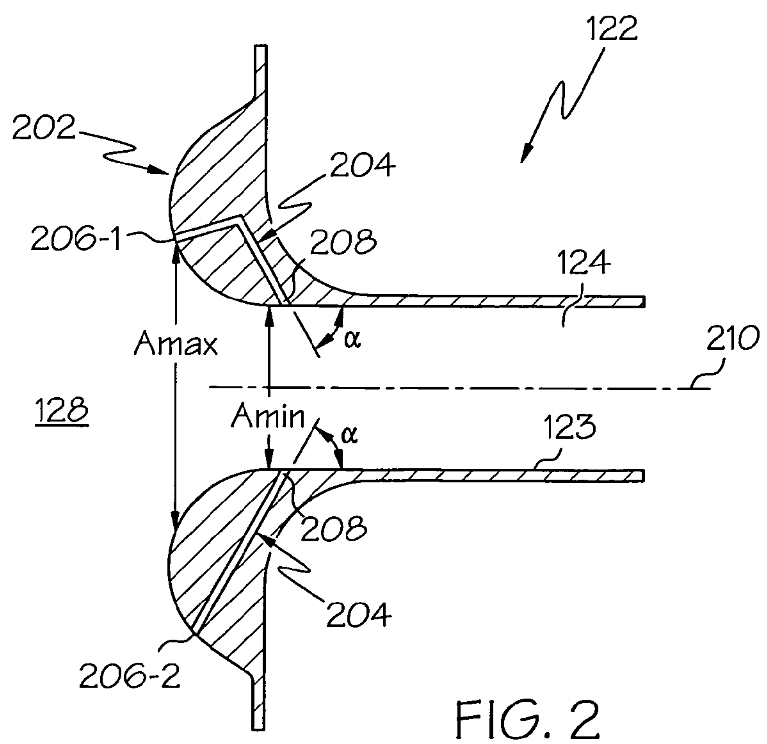
FIG. 2 is a simplified cross section of a portion of an exemplary embodiment of a duct that may be used with the engine shown in FIG. 1.

As shown in FIG. 2, the bleed air duct 122 includes an inlet section 202 and one or more flow limiting passages 204. The duct inlet section 202 is preferably configured to exhibit a relatively low loss flow characteristic. That is, the inlet section 202 preferably exhibits a loss coefficient of about 0.04 or less. In the depicted embodiment, this is achieved by contouring the inlet section 202, using any one of numerous known methods, to achieve the characteristics of a "well-rounded" inlet. As is generally known a well-rounded inlet has a radius of curvature divided by duct diameter (r/D) of about 0.35 or greater. It will be appreciated that a well-rounded inlet is merely exemplary of a particular low loss inlet configuration and that numerous other low loss inlet configurations could also be used. It will additionally be appreciated that configuring the inlet section 202 as a low loss inlet is merely preferred, and that it could be otherwise configured. Moreover, a rounded shape is merely exemplary, and other shapes and geometries that provide the desired flow characteristics may also be used.

No matter the particular shape, geometry, or flow characteristic of the inlet section 202, it is seen that the inlet section 202 is additionally configured such that its cross sectional flow area varies. In particular, the inlet section 202 is configured similar to a convergent nozzle. Specifically, the inlet section 202 is configured to have a cross sectional flow area that varies from a maximum cross sectional flow area ($A_{max}$) to a minimum cross sectional flow area ($A_{min}$). This change in flow area ensures that there is a reduction in static pressure between the plenum 128 and the duct flow passageway 124, which ensures bleed air flows into the duct 122 from the plenum 128 and, as will be described more fully below, that bleed air flows from the plenum 128 into and through the flow limiting passages 204. In the depicted embodiment, it is seen that the minimum cross sectional flow area ($A_{min}$) substantially matches the cross sectional flow area ($A_{duct}$) of the duct flow passageway 124 adjacent to, and down stream of, the inlet section 202. However, it will be appreciated that this is merely exemplary of a particular preferred embodiment, and that the minimum cross sectional flow area ($A_{min}$) could differ from that of the duct flow passageway cross sectional flow area ($A_{duct}$). It will additionally be appreciated that the inlet section 202 may be formed as an integral part of the duct 122, or the inlet section 202 may be formed as a separate component that is coupled to the duct 122.

The flow limiting passages 204 extend through the duct 122, and include an inlet port 206 and an outlet port 208. The flow limiting passage inlet ports 206 are in fluid communication with the plenum 128, and the flow limiting passage outlet ports 208 are in fluid communication with the duct flow passageway 124, preferably at, or near, the location of minimum static fluid pressure in the duct flow passageway 124. In the embodiment shown in FIG. 2, the flow limiting passages 204 extend through the inlet section 202, and the outlet ports 208 are disposed at, or near, the minimum cross sectional flow area ($A_{min}$), which generally corresponds to the location of minimum static pressure in the duct flow passageway 124. It will be appreciated that the flow limiting passages 204 need not extend through the inlet section 202, but could instead be configured to extend through other sections of the duct 122.

The flow limiting passage inlet ports 206, as was just noted, are in fluid communication with the plenum 128. However, the specific location of each flow limiting passage inlet port 206 may vary. For example, FIG. 2 depicts two flow limiting passage inlet ports—a first inlet port 206-1, and a second inlet port 206-2—both of which are located at different distances from a centerline 210 of the duct inlet port 126. The location of one or more of the flow limiting passage inlet ports 206 is preferably selected to achieve a desired result. This is because varying the location of the flow limiting passage inlet port 206, for a given location of the flow limiting passage outlet port 208, can affect the fluid flow rate through the flow limiting passage 204. In particular, it will be appreciated that the inlet section 202, due at least in part to its configuration, will have a specific static fluid pressure distribution at different locations along a surface 212 thereof. Thus, a desired flow characteristic can be achieved for each flow limiting passage 204 by locating its inlet port 206 a location of desired static fluid pressure. In embodiment depicted in FIG. 2, the static fluid pressure at the location of the first flow limiting passage inlet port 206-1 is less than the static fluid pressure at the location of the second flow limiting passage inlet port 206-2.

The flow limiting passages 204, at least near the flow limiting passage outlet ports 208, are also configured such that fluid exits the flow limiting passage outlet ports 208 at an injection angle ($\alpha$) relative to a tangent to the duct wall 123 through which each flow limiting passage outlet port 208 extends. It will be appreciated that the injection angle ($\alpha$) may vary, and is selected to achieve a desired result. It will additionally be appreciated that if the duct 122 includes a plurality of flow limiting passages 204, the injection angle ($\alpha$) of each flow limiting passage 204 may all be about the same, each flow passage 204 may have a different injection angle ($\alpha$), or some of the flow passages 204 may have the same injection angle ($\alpha$).

In addition to selecting one or more injection angles ($\alpha$), the cross sectional shape, and number, of the flow limiting passages 204 may be varied to achieve a desired result. Moreover, as FIG. 2 additionally shows, the flow limiting passages 204 may be configured to be substantially straight or to have one or more bends between the inlet 206 and outlet 208 ports. In some instances, due for example to configuration and/or size constraints of the inlet section, including one or more bends in the flow limiting passage 204 may be needed to locate the inlet port 206 and outlet port 208 at the desired locations.

Figure 3:
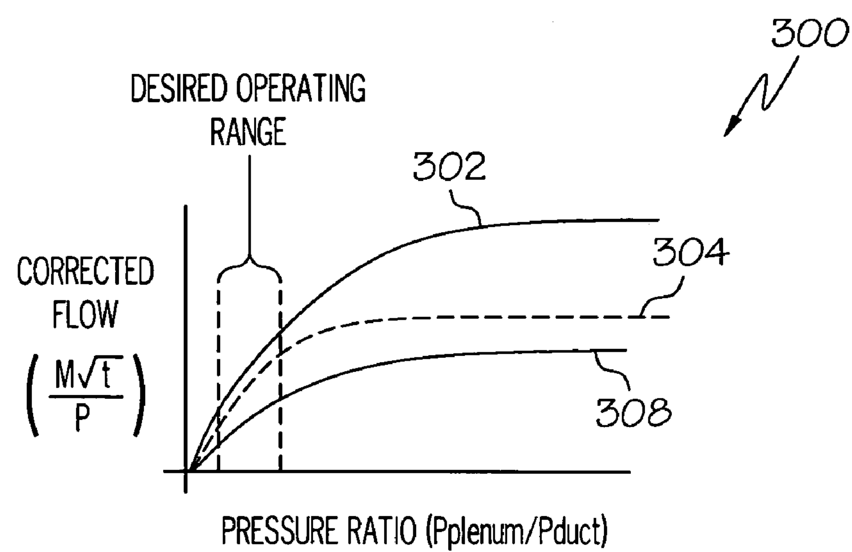
FIG. 3 is a graph that depicts correct flow versus pressure ratio for various duct configurations, including a duct configured in accordance with an embodiment of the present invention.

A duct 122 configured as described herein will limit or choke the flow into and through the duct flow passageway 124 to a desired flow magnitude. The duct 122 will additionally exhibit flow characteristics similar to, though slightly less than, that of a duct having a conventional low loss inlet, in a desired flow range. For example, FIG. 3 depicts a graph 300 of corrected flow ($\dot{m}\sqrt{T}/P$) versus pressure ratio ($P_{plenum}/P_{duct}$) for a conventional low loss inlet 302 and an inlet configured as described herein 304. As this graph 300 shows, in the desired operating range of the duct 122, a low loss inlet section 202 configured in accordance with the principles of the present invention exhibits flow characteristics similar to that of a conventional low loss inlet section. Although the pressure loss is slightly more than that of a conventional inlet section, it is not as large as the pressure loss exhibited by a conventional sharp edge orifice inlet section 308. The graph 300 also clearly shows that the low loss inlet section 202 in accordance with the principles of the present invention will limit flow into and through the duct flow passageway 124 to a magnitude substantially less than that of a conventional low loss inlet section. Indeed, the flow is limited to a magnitude just slightly greater than that of the conventional sharp edge orifice inlet section 308.

The general flow characteristics illustrated in FIG. 3, and described above, are achieved as a result of the effect that fluid flow through the flow limiting passages 204 has on fluid flow into and through the duct flow passageway 124. Specifically, during operations in the desired operating range of the duct 122, fluid flow through the flow limiting passages 204 will preferably have minimal effect on the fluid flow into and through the duct flow passageway 124. Indeed, the flow limiting passages 204 are preferably located and configured such that in this desired operating range, in which relatively low pressure ratios occur, the fluid exiting the flow limiting passage outlet ports 208 is substantially attached to the duct wall 123. However, at relatively high pressure ratios such as, for example, in the unlikely occurrence of a leak or breakage in the duct 122, the fluid exiting the flow limiting passage outlet ports 208 will no longer be attached to the duct wall 123. Instead, the fluid will disturb the fluid entering the duct flow passageway 124, causing mixing and shock losses, which will limit the fluid flow rate into and through the duct flow passageway 124.

The duct 122 and graph 300 illustrated in FIGS. 2 and 3, respectively, are for a duct 122 that includes a low loss inlet section 202. It will be appreciated, however, that in some instances the configuration of the duct 122, plenum 128, or surrounding equipment, may not provide sufficient room to include a low loss inlet section 202. In such instances, the duct 122 may instead include a flow venturi 402, such as the one shown in FIG. 4. The flow venturi 402 provides the same functionality and purpose as the low loss inlet section 202 and, similar to the inlet section 202, has a cross sectional flow area that varies from a maximum cross sectional flow area ($A_{max}$) to a minimum cross sectional flow area ($A_{min}$).

The flow venturi 402 may be disposed within the duct 122 proximate the duct inlet port 126 or at a location downstream of the duct inlet port 126. No matter the specific location of the flow venturi 402, one or more of the flow limiting passages 204 extend through the duct 122. Similar to the embodiment depicted in FIG. 2, the flow limiting passage inlet ports 206 are in fluid communication with the plenum 128, or a section of the duct 122 upstream of the flow venturi 402. The flow limiting passage outlet ports 208 are in fluid communication with the duct flow passageway 124, preferably at, or near, the location of minimum static fluid pressure in the flow venturi 402, which is at, or near, its minimum cross sectional flow area ($A_{min}$).

Figure 4:
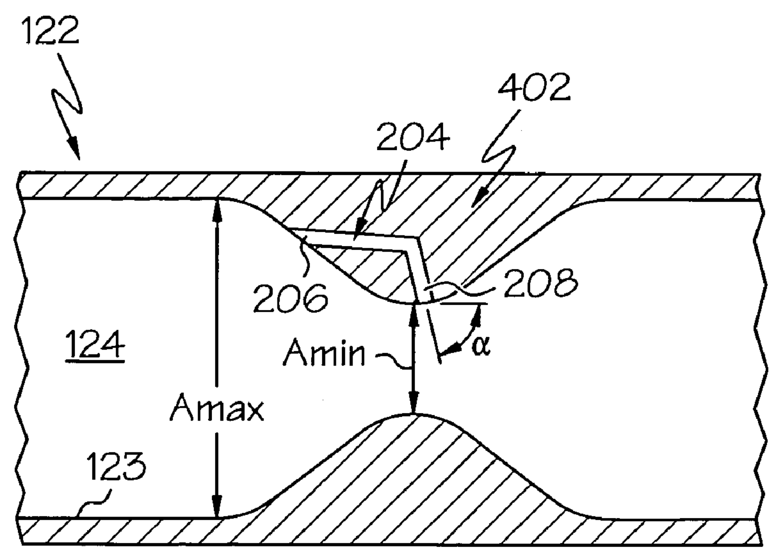
FIG. 4 is a simplified cross section of a portion of an exemplary alternative embodiment of a duct that may be used with the engine shown in FIG. 1.

As with the embodiment of FIG. 2, the configuration, shape, location, and various other parameters associated with the flow limiting passages 204 included in the embodiment shown in FIG. 4 may be similarly varied to meet a desired flow characteristic.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A low loss flow limited passageway, comprising:

a duct having an inner surface that defines a flow passageway, and including at least an inlet port in fluid communication with the flow passageway, the inlet port adapted to receive a flow of fluid from an inlet plenum and having at least a first cross sectional flow area, at least a portion of the flow passageway downstream of the inlet port having a second cross sectional flow area that is less than the first cross sectional flow area; and one or more flow limiting passages extending through the duct, the one or more flow limiting passages including an (i) inlet port in fluid communication with the inlet plenum and (ii) an outlet port in fluid communication with the duct flow passageway proximate the portion thereof having the second cross sectional flow area, and including a central axis that extends perpendicularly therefrom into the duct flow passageway, the central axis forming an injection angle with respect to the duct inner surface, wherein the injection angle is disposed such that the flow of fluid into and through the flow passageway is less than that of a duct that is configured substantially identical to the above-recited duct but does not include the above-recited one or more flow limiting passages.

2. The passageway of claim 1, wherein the one or more flow limiting passages are substantially straight between the inlet and outlet ports.

3. The passageway of claim 1, wherein at least selected ones of the one or more flow limiting passages include one or more bends between the inlet and outlet ports.

4. The passageway of claim 3, wherein the inlet ports of the selected ones of the one or more flow limiting passages are disposed at a location of predetermined static pressure adjacent the duct inlet port.

5. The passageway of claim 1, wherein the duct inlet port is configured as a low loss inlet.

6. The passageway of claim 5, wherein the low loss inlet is configured as a well-rounded low loss inlet.

7. A low loss flow limited passageway, comprising:

a duct having an inner surface that defines a flow passageway, and including at least an inlet port in fluid communication with the flow passageway, the duct inlet port adapted to receive a flow of fluid from an inlet plenum and having cross sectional flow area that varies, whereby when fluid flows through the inlet port into the flow passageway a minimum static fluid pressure is developed in the flow passageway at a location downstream of the inlet port; and one or more flow limiting passages extending through the duct, the flow limiting passages including (i) an inlet port in fluid communication with the inlet plenum and (ii) an outlet port in fluid communication with the duct flow passageway proximate the location where the minimum static fluid pressure is developed, and including a central axis that extends perpendicularly therefrom into the duct flow passageway, the central axis forming an injection angle with respect to the duct inner surface, wherein the injection angle is disposed such that the flow of fluid into and through the flow passageway is less than that of a duct that is configured substantially identical to the above-recited duct but does not include the above-recited one or more flow limiting passages.

8. The passageway of claim 7, wherein the one or more flow limiting passages are substantially straight between the inlet and outlet ports.

9. The passageway of claim 7, wherein at least selected ones of the one or more flow limiting passages include one or more bends between the inlet and outlet ports.

10. The passageway of claim 9, wherein the inlet ports of the selected ones of the one or more flow limiting passages are disposed at a location of predetermined static pressure adjacent the duct inlet part.

11. The passageway of claim 7, wherein the duct inlet port is configured as a low loss inlet.

12. The passageway of claim 11, wherein the low loss inlet is configured as a well-rounded low loss inlet.

13. The passageway of claim 7, wherein:

the duct inlet port cross sectional flow varies from a maximum area to a minimum area; and the duct flow passageway downstream of, and adjacent to, the duct inlet port has a cross sectional flow area that varies from the minimum area to the maximum area, whereby the duct inlet port and duct flow passageway adjacent to the duct inlet port form a flow venturi.

14. A low loss flow limited passageway, comprising:

a duct having an inner surface that defines a flow passageway, and including at least an inlet section, the duct inlet section including (i) an inlet flow port adapted to receive a flow of fluid from an inlet plenum and (ii) an outlet flow port in fluid communication with the flow passageway, the inlet section configured to have a cross sectional flow area that varies from a maximum cross sectional flow area proximate its inlet flow port to a minimum cross sectional flow area proximate its outlet flow port; and one or more flow limiting passages extending through the inlet section, each flow limiting passage including (i) an inlet port adapted to receive a flow of fluid from the inlet plenum and (ii) an outlet port disposed proximate the minimum cross sectional flow area and in fluid communication with the flow passageway, and including a central axis that extends perpendicularly therefrom into the duct flow passageway, the central axis forming an injection angle with respect to the duct inner surface, wherein the injection angle is disposed such that the flow of fluid into and through the flow passageway is less than that of a duct that is configured substantially identical to the above-recited duct but does not include the above-recited one or more flow limiting passages.

15. The passageway of claim 14, wherein the one or more flow limiting passages are substantially straight between the inlet and outlet ports.

16. The passageway of claim 14, wherein at least selected ones of the one or more flow limiting passages include one or more bends between the inlet and outlet ports.

17. The passageway of claim 16, wherein the inlet ports of the selected ones of the one or more flow limiting passages are disposed at a location of predetermined static pressure adjacent the duct inlet port.

18. The passageway of claim 14, wherein the duct inlet port is configured as a low loss inlet.

19. The passageway of claim 18, wherein the low loss inlet is configured as a well-rounded low loss inlet.

20. A low loss flow limiting passageway, comprising:

a duct having a wall that defines a flow passageway;

a flow venturi disposed within the duct flow passageway, the flow venturi having an upstream end, a downstream end, and a flow constricting throat disposed therebetween;

one or more flow limiting passages extending through the duct, the one or more flow limiting passages including an (i) inlet port in fluid communication with the flow venturi upstream end and (ii) an outlet port in fluid communication with the flow constricting throat, and including a central axis that extends perpendicularly therefrom into the flow constricting throat, the central axis forming an injection angle with respect to the flow constricting throat, wherein the injection angle is disposed such that a flow of fluid into and through the duct and flow venturi is less than that of a duct and flow venturi that are configured substantially identical to the above-recited duct and flow venturi but do not include the above-recited one or more flow limiting passages.

21. A low loss flow limited passageway, comprising:

a duct having an inner surface that defines a flow passageway, and including at least including an inlet structure adapted to receive a flow of fluid from an inlet plenum, the inlet structure configured to have a loss coefficient of about 0.04 or less; and one or more flow limiting passages extending through the inlet structure, each flow limiting passage including (i) an inlet port adapted to receive a flow of fluid from the inlet plenum and (ii) an outlet port disposed proximate the minimum cross sectional flow area and in fluid communication with the flow passageway, and including a central axis that extends perpendicularly therefrom into the duct flow passageway, the central axis forming an injection angle with respect to the duct inner surface, wherein the injection angle is disposed such that the flow of fluid into and through the flow passageway is less than that of a duct that is configured substantially identical to the above-recited duct but does not include the above-recited one or more flow limiting passages.

22. A turbine bleed air system, comprising:

a gas turbine engine including:

an engine case having a bleed air supply plenum disposed therein, a compressor, a combustor, and a turbine all mounted in flow series within the engine case; and a low loss flow limiting duct in fluid communication with the bleed air outlet port, the duct including:

a wall that defines a flow passageway, an inlet port in fluid communication with the flow passageway, the inlet port adapted to receive a flow of fluid from the bleed air supply plenum and having at least a first cross sectional flow area, at least a portion of the flow passageway downstream of the inlet port having a second cross sectional flow area that is less than the first cross sectional flow area, and one or more flow limiting passages extending through the duct, the one or more flow limiting passages including an (i) inlet port in fluid communication with the inlet plenum and (ii) an outlet port in fluid communication with the duct flow passageway proximate the portion thereof having the second cross sectional flow area.

* * * * *